United States Patent
Allegorico et al.

(10) Patent No.: US 11,042,821 B2
(45) Date of Patent: Jun. 22, 2021

(54) METHODS AND SYSTEMS FOR OPTIMIZING FILTER CHANGE INTERVAL

(71) Applicant: Nuovo Pignone Tecnologie Srl, Florence (IT)

(72) Inventors: Carmine Allegorico, Florence (IT); Marco Santini, Florence (IT); Claudio Antonini, Florence (IT); Laura De Stefanis, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 250 days.

(21) Appl. No.: 16/084,548

(22) PCT Filed: Mar. 31, 2017

(86) PCT No.: PCT/EP2017/057620
§ 371 (c)(1),
(2) Date: Sep. 12, 2018

(87) PCT Pub. No.: WO2017/167928
PCT Pub. Date: Oct. 5, 2017

(65) Prior Publication Data
US 2019/0073619 A1 Mar. 7, 2019

(30) Foreign Application Priority Data
Mar. 31, 2016 (IT) .......................... 102016000033238

(51) Int. Cl.
*G06Q 10/00* (2012.01)
*G06Q 10/06* (2012.01)
(Continued)

(52) U.S. Cl.
CPC ... *G06Q 10/06315* (2013.01); *B01D 46/0086* (2013.01); *G01M 15/14* (2013.01);
(Continued)

(58) Field of Classification Search
CPC ........ G06Q 10/20; G06Q 10/04; G06Q 10/06; G06Q 10/0635; G06Q 30/02; G06Q 30/06;
(Continued)

(56) References Cited

U.S. PATENT DOCUMENTS 6,009,404 A 12/1999 Eimer
2003/0233248 A1* 12/2003 Shingu ................... G06Q 30/02
703/7

(Continued)

FOREIGN PATENT DOCUMENTS

EP 1 171 217 A1 1/2002
WO 2013/150170 A1 10/2013

OTHER PUBLICATIONS

Hiner, Stephen D. Strategy for Selecting Optimised Technologies for Gas Turbine Air Inlet Filtration Systems. Proceedings of the ASME Turbo Expo 2011. 559-568. (Year: 2011).*

(Continued)

*Primary Examiner* — William S Brockington, III
(74) *Attorney, Agent, or Firm* — Baker Hughes Patent Org.

(57) ABSTRACT

Provided is a method for determining a filter change schedule for a gas turbine. The method includes determining differential pressure variation across filters and a time elapsed since a last filter change, where the differential pressure variation and the time elapsed are each associated with at least one filter disposed in the gas turbine. The method also includes estimating a future power loss and/or a future fuel consumption caused by the differential pressure variation. Moreover, the method can include determining the filter change schedule based on a cost of the filter change, the time elapsed, a cost of the future power loss, and optionally (Continued)

a cost of the future fuel consumption, a cost of emission variation, and a cost of production loss.

21 Claims, 5 Drawing Sheets

(51) Int. Cl.
   *B01D 46/00* (2006.01)
   *G01M 15/14* (2006.01)
   *G06Q 10/10* (2012.01)
   *F02C 7/052* (2006.01)

(52) U.S. Cl.
   CPC ......... *G06Q 10/1097* (2013.01); *G06Q 10/20* (2013.01); *F02C 7/052* (2013.01); *F05D 2230/72* (2013.01); *F05D 2260/80* (2013.01); *F05D 2270/20* (2013.01)

(58) Field of Classification Search
   CPC ........ G06Q 30/0629; G06Q 10/06315; G01M 15/14; F02C 7/052
   See application file for complete search history.

(56) References Cited

U.S. PATENT DOCUMENTS

| | | | |
|---|---|---|---|
| 2009/0173078 A1* | 7/2009 | Thatcher | F02C 9/20 60/773 |
| 2011/0308308 A1 | 12/2011 | Herman et al. | |
| 2013/0103352 A1 | 4/2013 | ter Horst et al. | |
| 2015/0294048 A1* | 10/2015 | Jones | G06Q 10/0635 703/2 |
| 2016/0342957 A1* | 11/2016 | Sloup | G06Q 30/0226 |

OTHER PUBLICATIONS

Search Report and Written Opinion issued in connection with corresponding IT Application No. 102016000033238 dated Dec. 14, 2016.

International Search Report and Written Opinion issued in connection with corresponding PCT Application No. PCT/EP2017/057620 dated Jul. 5, 2017.

International Preliminary Report on Patentabilty issued in connection with corresponding PCT Application No. PCT/EP2017/057620 dated Oct. 2, 2018.

\* cited by examiner

METHODS AND SYSTEMS FOR OPTIMIZING FILTER CHANGE INTERVAL

TECHNICAL FIELD

The present disclosure relates to optimizing filter change intervals. More particularly, the present disclosure relates to optimizing filter change intervals in gas turbines.

BACKGROUND

Gas turbines typically include at least one filter. For example, a gas turbine can include a plurality of air filters that are arranged in stages throughout the turbine. After prolonged use, these filters require changing to maintain a desired performance of the turbine. Each of these filters may have a different time at which it needs to be changed. As such, in the current state of the art, control systems are provided to monitor the filters and trigger alarms for excessive pressure drops, at which point filters that undergo these excessive pressure drops are replaced in order to prevent suboptimal turbine performance.

Maintenance for replacing a filter has its own direct costs (i.e. parts and labor). Other costs include the loss of revenue from decreased production of the gas turbine during maintenance, the cost of increased fuel consumption, and the cost of increased emissions of pollutants resulting from the increased fuel consumption.

SUMMARY

Given the aforementioned deficiencies, a need exists for smart systems capable of optimizing filter change schedules or intervals to minimize losses typically associated with filter degradation. The embodiments solve or mitigate the above-noted deficiencies.

For example, one embodiment provides a method for determining a filter change schedule for machine gas turbine. The method includes measuring the differential pressure variation across a filter and the time elapsed since the filter was last changed and determining an optimum filter change interval based on the differential pressure variation and the time elapsed. The method includes estimating a future power loss due to increasing differential pressure across the filter and optionally a future fuel consumption caused by a loss of efficiency resulting from the increasing differential pressure across the filter. The method further includes determining the optimum filter change schedule based on at least one of a cost of the filter change, the time elapsed, and optionally a cost of the future power loss (e.g. the loss of production in case of mechanical drive applications), and optionally a cost of the future fuel consumption, and a cost of production loss due to the outage resulting from changing the filter. The future power loss estimation is realized measuring ambient temperature and pressure, the discharge temperature of the gas turbine and the speed of the gas turbine.

The method can also include determining the variation in the emission of one or more pollutants resulting from increased differential pressure across the filter. In some embodiments, the optimum filter change schedule can also be determined based on the cost of the variation in the emission of the one or more pollutants. A pollutant can be any pollutant that is emitted when operating machine gas turbine. For example, in some embodiments, a pollutant can be NOx, CO, $CO_2$, and SOx.

Another embodiment provides a system for determining a filter change schedule for machine gas turbine. The system includes a processor and a memory storing instructions that, when executed by the processor, cause the processor to perform certain operations. The operations can include measuring differential pressure variations across filters disposed at the air intake of the gas turbine and a time elapsed since a last filter change, where the pressure change and the time elapsed are each associated with at least one filter disposed in the gas turbine. The operations can further include estimating a future power loss and optionally a future fuel loss caused by the variation in differential pressure. Furthermore, the operations can include determining the filter change schedule based on a cost of the filter change, a cost of the future power loss, and optionally a cost of the future fuel consumption, a cost of the variation in pollutant emission resulting from the increase in differential pressure across the at least one filter, the time elapsed, and a cost of production loss due to the outage experienced when changing the at least one filter.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
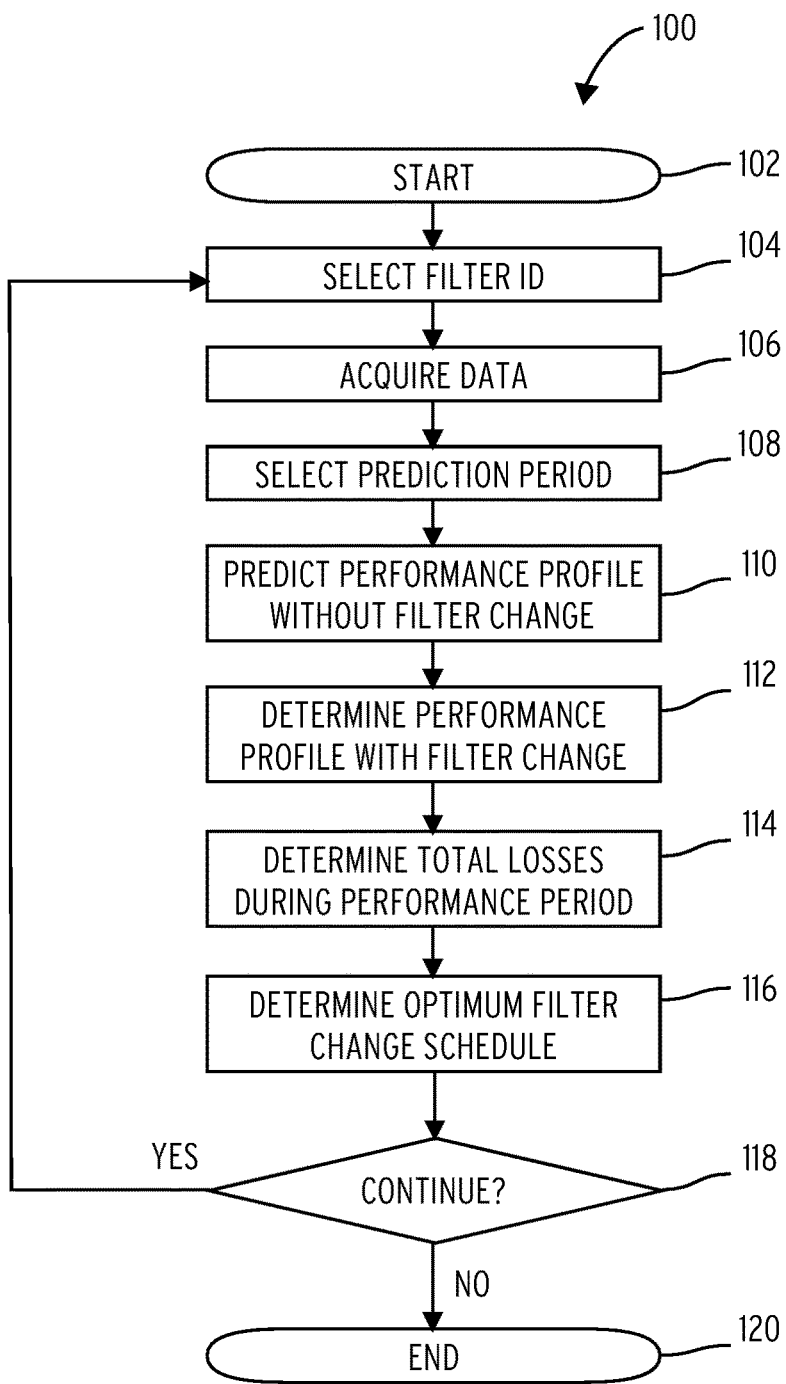
FIG. 1 depicts a flow chart of a method, according to an embodiment.
Figure 2:
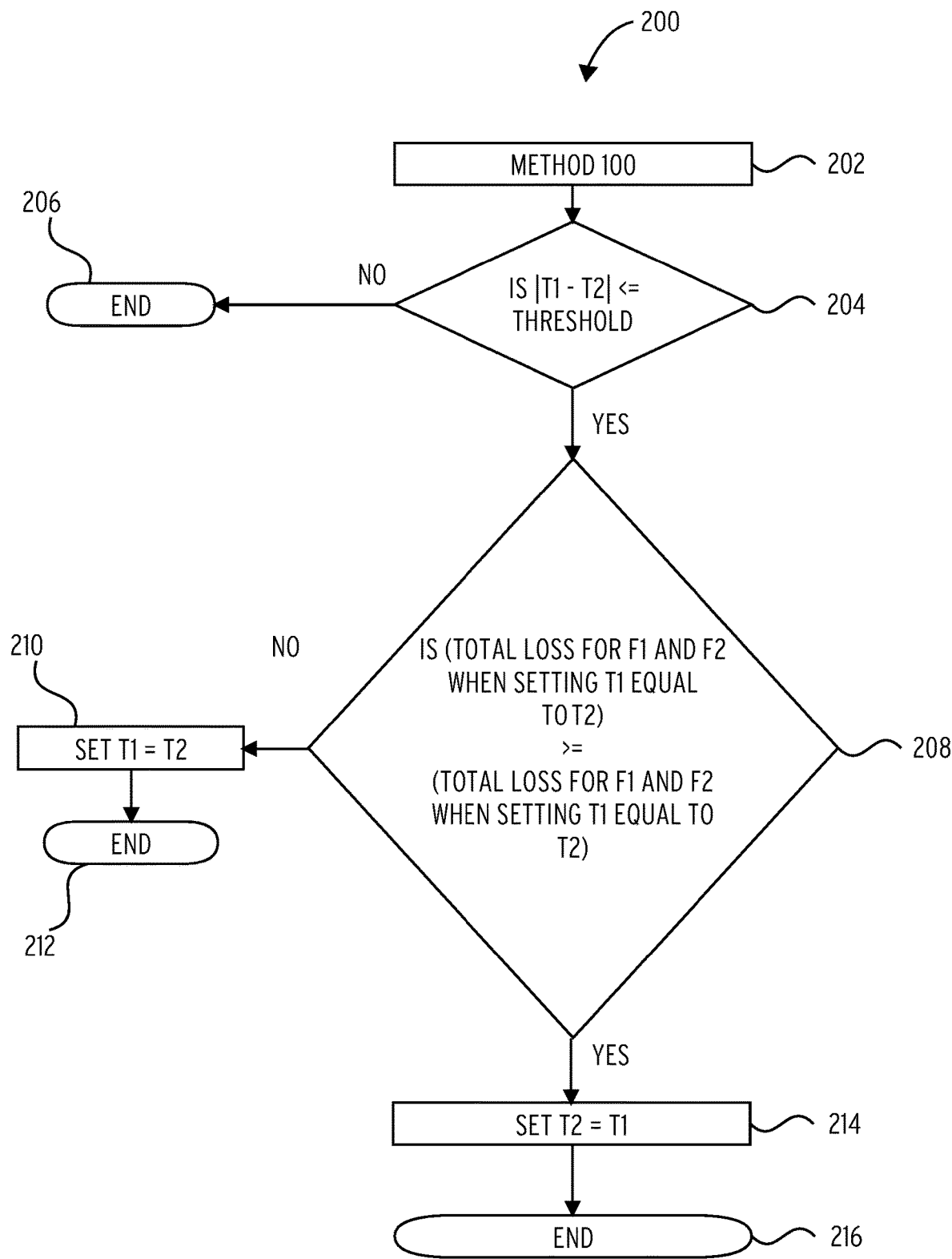
FIG. 2 depicts a flow chart of a method, according to another embodiment.

FIG. 1 depicts a flow chart of a method 100, according to an embodiment. Method 100 begins at step 102, and it includes selecting a filter identifier (ID) from a database containing information associated with each filter assembled in a gas turbine (step 104). For example, and not by limitation, the identifier can be a number specific to a particular filter of a filter assembly of the gas turbine. The database can be stored in a memory communicatively coupled to a controller executing method 100, as shall be discussed with respect to FIG. 5.

Moreover, the filters of the gas turbine can be, for example and not by limitation, a pre-filter, a guard filter, or a HEPA filter. As such, selecting the filter ID entails identifying a filter for which method 100 is to predict an optimum filter change schedule. One of ordinary skill in the relevant art(s) will readily appreciate that step 104 can include selecting identifiers for more than one filter at once. In addition, method 100 can perform an operation associated with a step subsequent to step 104 for each one of the selected filters, either in parallel or sequentially.

At step 106, method 100 includes acquiring data associated with one or more filters identified at step 104. Data acquisition can include fetching, by a controller executing method 100, data from sensors coupled to the gas turbine and/or to the filter assembly included in the gas turbine. The sensors can be configured to measure or estimate pressure losses for the selected filter, starting from a recorded time of a last filter change event. The time at which the last filter change event took place can be accessed from a database by the controller.

Method 100 also includes selecting a prediction period that represents a time window in the future for which performance can be predicted. (Step 108). For example, if method 100 is executed at time t1, the prediction period can be (t1+delta t1), where delta t1 is a number greater than zero. The measured or estimated pressure losses are first used to predict a performance profile (i.e. power loss vs. time, fuel consumption vs. time, and emission variation of NOx, CO2, CO, CO2, or SOx (or any combination thereof) vs. time), over the prediction period for a case where a filter change is not used (step 110).

For example, the performance profile without filter change can be a projected power loss resulting from not changing the selected filter during the duration of the performance period. This performance profile can be extrapolated from measurements over a past period, i.e. from power losses for a period extending from (t1−delta t2) to t1, where delta t2 is greater than zero and the time (t1−delta t2) represents the time at which the last filter change event was recorded.

Method 100 further includes determining a performance profile when a filter is changed during the prediction period (step 112). This performance profile can simply be obtained from the actual power loss and fuel consumption measured for the period extending from the last filter change to the time method 100 is being executed, i.e. from time (t1−delta t2) to t1.

Generally speaking, however, emission variation, power loss and fuel consumption for cases where the filter is changed can be obtained from known transfer functions derived by the gas turbine's manufacturer via performance maps based on predetermined thermodynamic models. Such transfer functions may be stored in a database that is communicatively coupled to the controller executing method 100.

Total power losses, fuel consumption, emission variation cost, and maintenance cost over the prediction period are computed at step 114. In one embodiment, the total losses are the sum of three distinct loss components (i.e. power losses, fuel consumption, and maintenance cost). In this embodiment, the first component is a loss in base load (denoted L1 in Equation 1 below), which depends on the power loss and on the fuel consumption. The second component is a maintenance cost (denoted L2 in Equation 2 and due to the cost of filters, cost of labor, and loss of production due to the outage associated with the change of the selected filter). The third component is a partial load coast (denoted L3 in Equation 3) that depends on the fuel consumption, which can be obtained through a fuel loss transfer function. The parameters in Equations 1, 2, and 3, are listed in Table 1 below.

$$L1 = Ni \cdot Ni \cdot \int_0^T [fpl(t) + ffs(t)] dt \quad (1)$$

$$L2 = Ni \cdot Ci \quad (2)$$

$$L3 = Ni \cdot \int_0^T ffl(t) dt \quad (3)$$

The sum of these contributions, or any combination of them, i.e. the total loss, has a minimum. The specific time at which this minimum occurs is the optimum time to change the selected filter. As such, at step 116, method 100 includes determining the time at which the total loss is minimized, thus providing an optimum filter change schedule. In some embodiments, the total loss has four loss contribution terms, namely, L1, L2, L3 as shown above, and L4, which is associated with the emission variation cost.

TABLE 1

| Symbol | Description |
| --- | --- |
| T | time horizon |
| i | index of filter stage (e.g. pre-filter, HEPA, guard) |
| fpl | transfer function for power loss ($) |
| ffs | transfer function for fuel consumption in base load ($) |
| ffl | transfer function for fuel consumption in part load ($) |
| Ti | filter change interval (or schedule) for stage i |
| Ni | number of filter changes in T |
| Ci | cost due to filter change for stage i ($) |

At decision block 118, method 100 can either continue to select another filter identifier at step 104, or method 100 can simply end at step 120. Method 100 may be programmed on a controller and executed for each filter of the filter assembly included in the gas turbine. As such, decision block 118 can correspond to the control condition of a loop configured to provide an optimum filter change schedule for each filter of a plurality of filters.

Method 200 shows a flow chart according to another embodiment. Method 200 is designed to minimize the overall total loss when considering at least two filters. For example, method 100, when executed at step 202, reports optimum filter change time T1 for a first filter F1 and optimum filter change time T2 for a second filter F2. If these times are sufficiently close, i.e. within a predetermined threshold, then the optimum filter change time could be the same for both filters, depending on the maintenance costs.

Method 200 thus includes, at decision block 204, checking whether the two reported times are within a predetermined threshold (e.g. 1,000 hours). In the event that the two times are not within the predetermined threshold method 200 ends at step 206. Otherwise, method 200 continues to decision block 208 to determine which of the two times is the most convenient with respect to the sum of the three contributing loss factors (fuel consumption, power loss, and maintenance costs). In alternate embodiments, method 200 can continue at decision block 208 to determine which of the two times is the most convenient with respect to the sum of four contributing loss actors (fuel consumption, power loss, maintenance cost, and emissions variation cost).

If the total loss, i.e. the sum of all contributing loss factors or any combination of them, for filter F1 and filter F2 when setting T1 equal to T2 is greater than or equal to the total loss for filter F1 and filter F2 when setting T2 equal to T1, then T2 is set to T1 at step 214, and method 200 ends at step 216. Otherwise, T1 is set to T2 at step 210, and method 200 ends at step 212.

In another embodiment, an interaction term for the optimal time T1 (see Equations 1-3) may be used to account for situations when optimum filter schedules are close. For example, if both filters are changed simultaneously there could be a saving in terms of labor and outage costs. For example the function describing this condition could be $G=\gamma f(T1,T2)$, and the parameter $\gamma$ may be tuned to choose different thresholds.

The future power loss is estimated measuring ambient temperature and pressure, the discharge temperature of the gas turbine and the speed of the gas turbine. In particular, the speed of the gas turbine can be the rotational speed of the main shaft of the gas turbine, when the gas turbine is a single-shaft gas turbine, or the rotational speed of the power turbine, when the gas turbine is a multi-shafts gas turbine having a gas generator and power turbine fluidly coupled to the gas generator. Further parameters can be used to estimate the power loss, for example one or more of the following parameters can be selected: the temperature at the discharge of gas turbine compressor, pressure at the discharge of gas turbine compressor, position of inlet guide vanes of the gas turbine.

Figure 3:
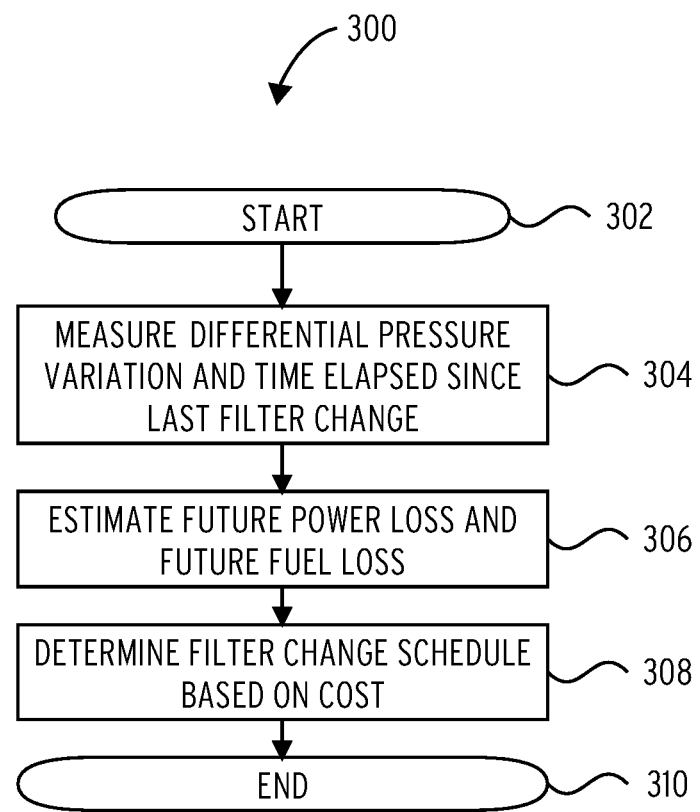
FIG. 3 depicts a flow chart of a method, according to an embodiment.

FIG. 3 is a flow chart of a method 300, according to yet another embodiment. Method 300 begins at step 302 and it includes measuring differential pressure variations (dP) across filters and the time elapsed since a last filter change. In some embodiments, the pressure change can be measured at the inlet of each filter of a plurality of filters included in the gas turbine. From these two measured parameters (dP and time elapsed) only, method 300 can determine an optimum filter change schedule for each one of the filters.

Following step 304, method 300 includes estimating future power losses, future fuel consumption, and optionally, future emission variation for each one of the filters. This may be achieved, as explained above, using respective loss transfer functions for power loss, emission variation, and fuel consumption.

A total cost associated with filter change, taking into account the predicted power and fuel losses, can be computed as described above with respect to methods 100 and 200. Based on the total cost, an optimum filter change schedule can be obtained by minimizing the total cost (step 308). Minimizing includes solving for an extremum of the total cost, as is well known in the art. Method 300 then ends at step 310.

Figure 4:
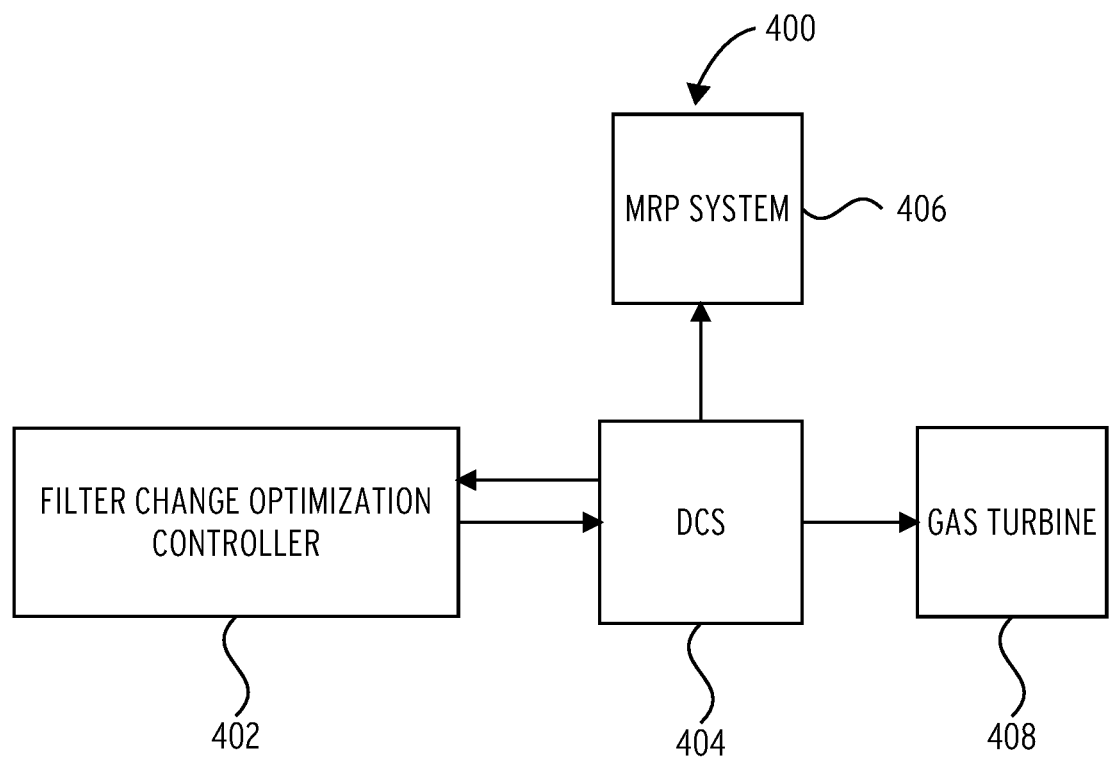
FIG. 4 depicts a method, according to yet another embodiment.

FIG. 4 depicts a method 400, according to yet another embodiment. Method 400 utilizes a filter change optimization controller 402 that can predict an optimum filter change time with any one of methods 100, 200, and 300. Filter change optimization controller 402 can interface with a distributed control system (DCS) 404 that controls one or more gas turbines 408. DCS 404 also interfaces with a material requirements planning (MRP) system 406, which can be a computerized system configured to provide services that include production planning, scheduling, and parts inventory control based on the statuses of the one or more gas turbines controlled by DCS 404.

Based on the predicted optimum filter change time obtained by filter optimization controller 402, method 400 can include changing at least one operational parameter of gas turbine 408 to alter when the optimum filter change time will be. For example, once a time T* is predicted by filter change optimization controller 402, at least one gas turbine parameter can be altered to extend the optimum filter change time beyond T* or to accelerate the optimum filter change time to occur before time T*. For example, a load of gas turbine 408 can be reduced or increased to achieve the aforementioned effects, respectively. Therefore, method 400 can drive the demand for filters in MRP system 400 and thus provide better inventory control and planning.

Figure 5:
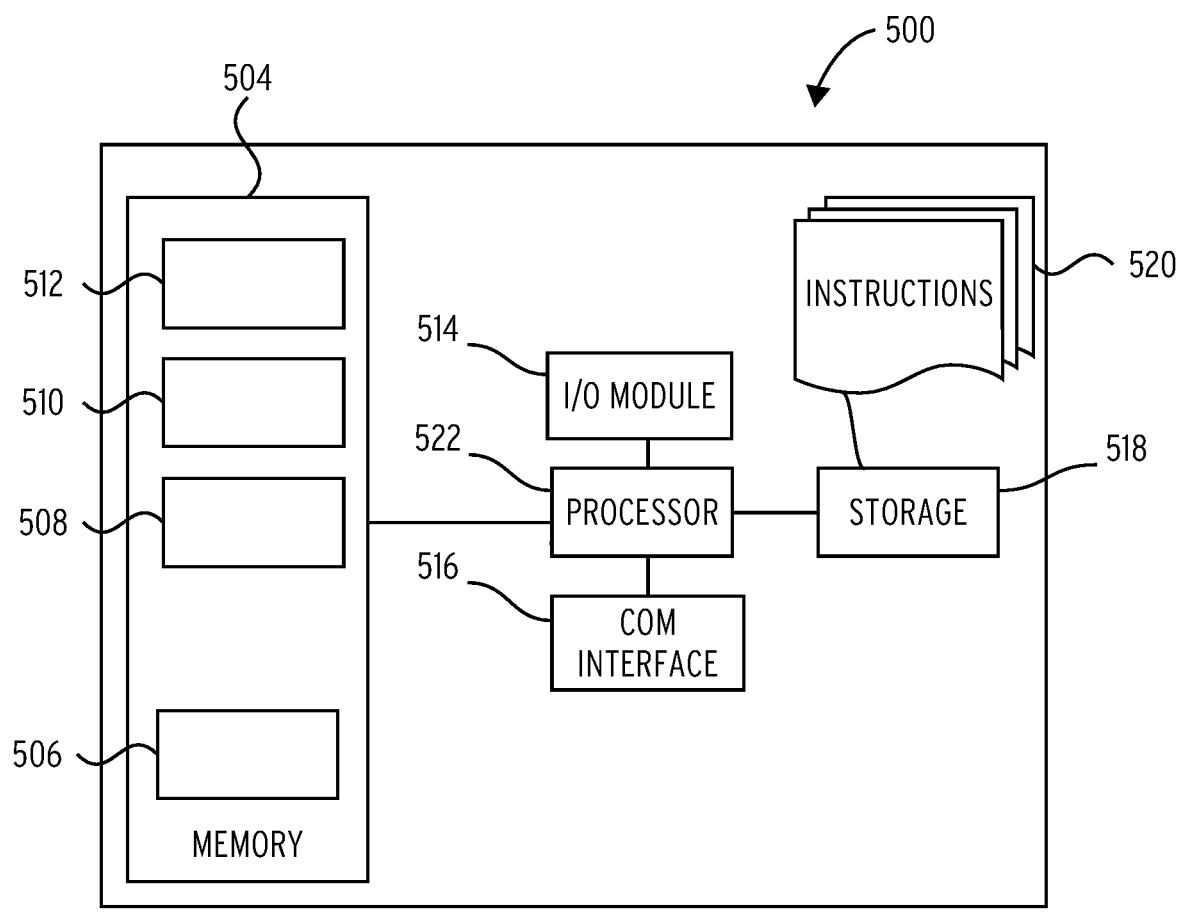
FIG. 5 is a block diagram of a device, according to an embodiment.

Having set forth the various exemplary method embodiments of the invention, a device 500 (or system) capable of executing these methods is now described. FIG. 5 shows a block diagram of device 500, which can include a processor 522 that has a specific structure. The specific structure is imparted to processor 522 by instructions stored in a memory 504 included therein and/or by instructions 520 that can be fetched from a storage medium 518. The storage medium 518 can be co-located with device 500 as shown in FIG. 5, or it can be located elsewhere and be communicatively coupled to device 500.

Device 500 can be a stand-alone programmable system, or it can be a programmable module located in a much larger system. For example, device 500 can be part of a gas turbine controller, or it can be part of a distributed control system (DCS), like DCS 404 shown in FIG. 4. Device 500 may include one or more hardware and/or software components configured to fetch, decode, execute, store, analyze, distribute, evaluate, and/or categorize information. One such component can be an input/output hardware (I/O module 414) configured to provide a user interface and/or to couple with sensors located in the gas turbine. In one embodiment, such sensors may be pressure sensors disposed at the inlet of each filter stage of the filters in the gas turbine, fuel expenditure sensors, and emission sensors located along the gas turbine's exhaust gas path, in particular at the outlet of the gas turbine compressor and/or at the discharge of the gas turbine.

Processor 522 can include one or more processing devices or cores (not shown). In some embodiments, processor 522 can be a plurality of processors, each having either one or more cores. Processor 522 can be configured to execute instructions fetched from memory 504, i.e. from one of memory block 512, memory block 510, memory block 508, or memory block 506. Alternatively, the instructions can be fetched from storage medium 518, or from a remote device connected to device 500, via communication interface 516.

Furthermore, without loss of generality, storage medium 518 and/or memory 504 can include a volatile or non-volatile, magnetic, semiconductor, tape, optical, removable, non-removable, read-only, random-access, or any type of non-transitory computer-readable medium. Storage medium 518 and/or memory 504 may include programs and/or other information that can be used by processor 522.

Furthermore, storage device storage medium 518 may be configured to log data processed, recorded, or collected during the operation of device 500. The data may be time-stamped, location-stamped, cataloged, indexed, or organized in a variety of ways consistent with data storage practice. Moreover, storage medium 518 can include databases that store information relating to past performance of the gas turbine as well as to time indices of when filters were previously changed.

In some embodiments, for example and not by limitation, memory block 508 may include instructions that, when executed by processor 512, cause processor 522 to perform certain operations. The operations can include measuring differential pressure change and a time elapsed since a last filter change, the differential pressure change and the last filter change each being associated with at least one filter disposed in the gas turbine. The operations can further include estimating a future power loss and/or a future fuel consumption, as well as a future emission variation caused by the differential pressure change.

Further, the operations can include determining the filter change schedule based on a cost of the filter change, a cost of the future power loss, and optionally a cost of the future fuel consumption, and a cost of production loss and/or a cost of variation in emissions resulting from the differential pressure change across the filters. The operations can further include determining, based on the differential pressure change, one of an actual power loss and an actual fuel consumption. Furthermore, the operations can include determining an optimum filter schedule change based on an outage cost figure and a total cost figure including either one of the future power loss and the future fuel loss.

Generally speaking, device 500 can execute any one of the methods described herein. Moreover, in other embodiments, the exemplary methods described herein can be provided in software or firmware form and stored on a computer-readable medium, which can be loaded to program and configure device 500 to function as explained above.

Embodiments of the invention provide several advantages not currently offered by techniques used in the state-of-the-art. For example, with embodiments of the invention, only two measured parameters (dP and Time) are needed for an estimation of the optimum filter change schedule. Furthermore, direct evaluation and minimization of losses provide optimal filter change schedules with respect to cost. As such, based on the methods and systems disclosed above, power profiles can be optimized with respect to filter changes.

Lastly, the embodiments, while having been described in the context of filters for gas turbines are not limited thereto; any type of industrial machine and/or industrial filtering system is contemplated. Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A method for determining a filter change schedule of one or more filters arranged upstream an air intake inlet of a gas turbine, the method comprising:
    measuring differential pressure variation across the one or more filters arranged upstream the air intake inlet of the gas turbine and a time elapsed since a last filter change, the differential pressure variation and the time elapsed each being associated with at least one filter;
    estimating a future power loss due to increasing differential pressure across the one or more filters and, optionally, a future fuel consumption caused by the differential pressure variation;
    determining the filter change schedule based on a cost of the last filter change, the time elapsed, a cost of the future power loss, and optionally a cost of the future fuel consumption; and
    via a filter change optimization controller that interfaces with a distributed control system controlling the gas turbine, changing at least one operational parameter of the gas turbine, including reducing or increasing a load of the gas turbine, to optimize the filter change schedule by further optimizing a time interval between filter changes.

2. The method according to claim 1, wherein the future power loss is estimated measuring ambient temperature and pressure, a discharge temperature of the gas turbine and a speed of the gas turbine.

3. The method according to claim 1, further comprising determining, the future power loss, the future fuel consumption, a future emission variation, based on, respectively, an actual power loss, an actual fuel loss, and an actual emission variation.

4. The method according to claim 1, wherein the cost of the last filter change is based on filter cost and cost of labor.

5. The method according to claim 1, wherein a cost of production loss is based on a loss of production due to outage.

6. The method according to claim 1, wherein estimating the future power loss, a future emission variation, and the future fuel consumption is based on the differential pressure variation across the at least one filter.

7. The method according to claim 1, wherein the filter change schedule includes an estimated time for changing the at least one filter.

8. The method according to claim 1, further comprising optimizing a power profile of the gas turbine with respect to the filter changes.

9. The method according to claim 1, further comprising determining a cost of production loss due to an outage.

10. The method according to claim 1, further comprising determining the optimized filter change schedule based on a cost of production loss and either one of the future power loss, the future fuel consumption, and a future emission variation.

11. The method according to claim 1, wherein the filter change schedule corresponds to the optimized time interval, the optimized time interval incorporating a specified time at which a sum of a cost of production loss, the cost of the future fuel consumption, a maintenance cost, and a cost of emission variation, or any combination thereof, is minimized.

12. The method according to claim 1, wherein determining the filter change schedule is also based on a variation in emission of at least one of NOx, CO, CO2 and SOx.

13. The method according to claim 1, further comprising determining an outage cost as a sum of a cost of filter change, either one of the cost of future power loss and the cost of future fuel consumption, and a cost of production loss.

14. A system for determining a filter change schedule for a gas turbine, the system comprising:
    a processor;
    a filter change optimization controller that interfaces with a distributed control system controlling the gas turbine; and
    a memory storing instructions that, when executed by the processor, cause the processor to perform operations comprising:
    receiving measurements of differential pressure variations across one or more filters disposed at an air intake of the gas turbine and of a time elapsed since a last filter change, the differential pressure variations and the time elapsed each being associated with at least one filter;
    estimating a future power loss due to increasing differential pressure across the one or more filters and, optionally, a future fuel consumption caused by the differential pressure variations; and determining the filter change schedule based on a cost of filter change, the time elapsed, a cost of the future power loss, and optionally a cost of the future fuel consumption, and a cost of future emission variation, wherein the filter change optimization controller is configured to change at least one operational parameter of the gas turbine, the change including reducing or increasing a load of the gas turbine, to optimize the filter change schedule by further optimizing a time interval between filter changes.

15. The system according to claim 14, wherein the operations further comprise determining the future power loss, the future fuel consumption, the future emission variation, based on, respectively, an actual power loss, an actual fuel loss, and an actual emission variation.

16. The system according to claim 14, wherein the processor further performs the operation of optimizing a power profile of the gas turbine with respect to the filter changes.

17. The system according to claim 14, wherein the operations further include determining a cost of production loss based on a loss of production due to an outage due to changing the one or more filters.

18. The system according to claim 14, wherein the operations further include determining the optimized filter change schedule based on a cost of production loss due to an outage for changing filters and a total cost figure including either one of the future power loss, the future fuel consumption, and the future emission variation.

19. A non-transitory computer-readable storage medium for determining a filter change schedule for a gas turbine, the computer-readable storage medium including instructions that when executed by a processor, cause the processor to perform operations comprising:

receiving measurements of differential pressure variations across filters disposed at an air intake of the gas turbine and of a time elapsed since a last filter change, the differential pressure variations and the time elapsed each being associated with at least one filter;

estimating a future power loss and, optionally, a future fuel consumption caused by the differential pressure across the filters;

determining the filter change schedule based on a cost of filter change, the time elapsed, a cost of the future power loss, and optionally a cost of the future fuel consumption, and a cost of future emission variation; and via a filter change optimization controller that interfaces with a distributed control system controlling the gas turbine, changing at least one operational parameter of the gas turbine, including reducing or increasing a load of the gas turbine, to optimize the filter change schedule by further optimizing a time interval between filter changes.

20. The non-transitory computer-readable storage medium according to claim 19, wherein the operations further comprise determining the future power loss, the future fuel consumption, the future emission variation, based on, respectively, an actual power loss, an actual fuel loss, and an actual emission variation.

21. The non-transitory computer-readable storage medium according to claim 19, wherein the operations further comprise determining the optimized filter change schedule based on an outage cost figure and a total cost figure including either one of the future power loss, the future fuel loss, and the future emission variation.

* * * * *